(12) United States Patent
Sudhues et al.

(10) Patent No.: US 12,495,740 B2
(45) Date of Patent: Dec. 16, 2025

(54) HEADER WITH LATERALLY FOLDABLE REEL TINES

(71) Applicant: Carl Geringhoff GmbH & Co. KG, Ahlen (DE)

(72) Inventors: Steffen Sudhues, Ahlen (DE); Dominik Sälker, Münster (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 714 days.

(21) Appl. No.: 17/881,718

(22) Filed: Aug. 5, 2022

(65) Prior Publication Data

US 2023/0038704 A1 Feb. 9, 2023

(30) Foreign Application Priority Data

Aug. 5, 2021 (DE) ..................... 10 2021 120 403.8

(51) Int. Cl.
*A01D 57/03* (2006.01)
*A01D 57/04* (2006.01)

(52) U.S. Cl.
CPC ............. *A01D 57/03* (2013.01); *A01D 57/04* (2013.01)

(58) Field of Classification Search
CPC ................................ A01D 57/03; A01D 57/04
See application file for complete search history.

(56) References Cited

U.S. PATENT DOCUMENTS

| | | | | |
|---|---|---|---|---|
| 2,380,173 | A | * | 7/1945 | Harrison ................ A01D 57/04 56/226 |
| 2,909,889 | A | * | 10/1959 | Gustafson .............. A01D 80/02 56/400 |
| 3,014,335 | A | * | 12/1961 | Nolt ....................... A01D 80/02 56/400 |
| 3,031,835 | A | * | 5/1962 | Gustafson .............. A01D 80/02 56/400 |
| 3,099,347 | A | * | 7/1963 | Dahlquist .............. A01D 80/02 198/692 |
| 3,553,950 | A | * | 1/1971 | Waser .................... A01D 80/02 56/400.21 |

(Continued)

FOREIGN PATENT DOCUMENTS

DE 102005052394 A1 * 5/2007 ............. A01D 57/02
GB 1578562 A * 11/1980 ......... A01D 78/1078

(Continued)

*Primary Examiner* — Arpad Fabian-Kovacs
(74) *Attorney, Agent, or Firm* — Gudrun E. Huckett

(57) ABSTRACT

A header for a harvester has a reel extending transverse to a working direction of the header. The reel has reel rake tubes distributed circumferentially about the reel. Reel tines are fastened to the reel rake tubes. At least some reel tines are rotatably supported in bearings at the reel rake tubes and can rotate about a rotation axis along a movement path, predetermined by a control, from a neutral position into an evasion position and back. The evasion position corresponds to a spatial position in which a free end of the reel tines has moved in a direction corresponding to a conveying direction of the conveying device in the region of the reel tines. A distance of the free end to the reel rake tube in evasion position is reduced in relation to a distance of the free end to the reel rake tube in neutral position.

14 Claims, 5 Drawing Sheets

(56) References Cited

U.S. PATENT DOCUMENTS

| | | | | |
|---|---|---|---|---|
| 3,849,974 | A | * | 11/1974 | James .................. A01F 15/08 |
| | | | | 56/226 |
| D237,527 | S | * | 11/1975 | van der Lely ............... D15/29 |
| 3,921,376 | A | * | 11/1975 | Hofer .................. A01D 61/00 |
| | | | | 56/400.21 |
| 3,983,683 | A | * | 10/1976 | James .................. A01D 89/00 |
| | | | | 56/364 |
| 4,473,994 | A | * | 10/1984 | Hein .................. A01D 80/02 |
| | | | | 56/400 |
| 4,481,758 | A | * | 11/1984 | Fishbaugh .......... A01D 80/02 |
| | | | | 56/400 |
| 6,324,823 | B1 | * | 12/2001 | Remillard .......... A01D 57/02 |
| | | | | 56/220 |
| 6,591,598 | B2 | * | 7/2003 | Remillard .......... A01D 57/03 |
| | | | | 56/226 |
| 6,843,045 | B2 | * | 1/2005 | Bickel .................. A01D 57/03 |
| | | | | 56/14.4 |
| 7,934,365 | B2 | | 5/2011 | Schumacher et al. |
| 9,526,209 | B2 | * | 12/2016 | Honey .................. A01D 57/12 |
| 9,622,413 | B2 | * | 4/2017 | Neely .................. A01D 63/04 |
| 2018/0242525 | A1 | * | 8/2018 | Schwinn ............. A01D 57/02 |
| 2018/0242535 | A1 | | 8/2018 | Schwinn |
| 2019/0269072 | A1 | | 9/2019 | Modak et al. |

FOREIGN PATENT DOCUMENTS

| | | | |
|---|---|---|---|
| JP | S63283517 | | 11/1988 |
| WO | WO-2007051514 A1 | * | 5/2007 ............. A01D 57/02 |

* cited by examiner

HEADER WITH LATERALLY FOLDABLE REEL TINES

BACKGROUND OF THE INVENTION

The present invention relates to a header for attachment to a harvesting machine, with a frame, a cutter bar arranged at the front side, a receiving surface for receiving the cut crop, conveying devices for conveying the cut crop, a reel rotatably driven and moveably connected to the frame, the reel comprising a plurality of reel rake tubes that are arranged in distribution about the circumference of the reel in its rotation direction and extend in a direction transverse to the working direction of the header, and a plurality of reel tines that are fastened to the reel rake tubes.

The invention concerns also a reel tine with a free end and an end opposite to the free end that is facing a bearing that comprises a fastening eye with a cavity for attachment to a reel rake tube that has a longitudinal center axis whose orientation corresponds to an extension direction of the reel rake tube to be received by it.

When in this description "front", "front side", and "rear" is mentioned, these terms are used always in relation to the working direction of the header. The working direction is the direction in which the header is moved in order to cut crop. When in this description a reel is mentioned, this concerns a reel that is of a one-piece configuration so that the one-piece reel extends across the entire working width of the header or a reel that is of a multi-part configuration so that the individual reel parts extend only across a partial working width, the plurality of reel parts together however cover the working width of the header.

From the publication DE 10 2005 052 394 A1 it is known to fasten a tine which is made from plastic material with a spring steel to a support body. The support body is usually comprised in this context of a round tube or a profiled section that is held at several bearing arms or bearing plates at a radial distance at the reel shaft. A plurality of support bodies are arranged in distribution about the circumference of the reel, and a plurality of reel tines are attached to each support body. A region, which is resiliently yielding and holds the tine in a yielding manner in case of a great load, is provided in the spring steel for avoiding overloads.

A resiliently supported reel tine is moveable in any load direction. The forces that are required in order to move a reel tine in an evasion direction are as large as the restoring forces that are built up in this context. This means that a spring that is to be designed to be movable easily in one direction must be moveable as easily in another direction. A reel tine that is to move crop in a conveying direction must however have a certain stiffness at least in conveying direction in order to be able to fulfill this task. The known springs as bearing for a reel tine always constitute only a compromise with respect to the configuration of the spring characteristic lines applying to them. Since in case of the resilient bearing of the reel tines known from the prior art the only concern is to avoid overloads, these reel tines move only at very high force peaks. In case of a contact of the reel tines with crop, the springs permit hardly any evasion movements.

It is the object of the present invention to improve the conveying behavior of the reel tines fastened to a header.

SUMMARY OF THE INVENTION

The object is solved for a header of the aforementioned kind with reel tines in that at least some of the reel tines are rotatably supported in a bearing at an associated reel rake tube wherein the rotational movement about a rotation axis is realized along a movement path predetermined by a control from a neutral position into an evasion position and back again, and the evasion position in relation to the neutral position corresponds to a spatial position of the reel tine in which the free end of the reel tine is moved in a direction which corresponds to the conveying direction of the conveying device in the region of the respective reel tine and the distance of the free end of the respective reel tine to the associated reel rake tube is reduced.

The object is solved for a reel tine of the aforementioned kind in that the reel tine is rotatably supported in the bearing wherein the rotational movement about an rotation axis is realized along a movement path predetermined by a control from a neutral position into an evasion position and back again so that the reel tine is movable in a rotational direction and is stiff in axial direction of the rotation axis.

Due to the rotational support of the reel tines, they are movable in their rotational direction while they remain stiff in the axial direction of their rotation axis. The rotation axis is oriented for this purpose transversely to the conveying direction of the conveying device. In this context, "transverse" is not limited to a precisely rectangular orientation relative to the conveying direction; slanted positions of the rotation axis relative to the conveying direction are also encompassed by this term. Due to the orientation of the rotation axis transverse to the conveying direction, it is possible to fold the free ends of the reel tines upwardly by means of a high-rising package of conveyed crop when the latter is rising so high on the receiving surface of the header during its conveyance with the conveying device that the uppermost layer of the package impacts laterally against the free ends of the reel tines. Packages of such a height can build on the header table in particular in case of the rapeseed harvest but also for other grain types. Since usually the quantity of the cut crop in conveying direction of the conveying device grows increasingly up to the discharge point, a high-rising package of conveyed crop is provided in particular in the region of the reel tines which are closer to the discharge point. Taking this fact into consideration, it can be advantageous to configure only the reel tines which are located closer to the discharge point in a rotatable manner or to provide differently sized pivot angles about which the reel tines are rotatably supported.

For upwardly folding the free ends of the reel tines, already relatively minimal forces are sufficient. Since the reel tines in axial direction of the rotation axis remain however stiff, the conveying action in this direction is fully maintained. When the reel thus rotates about its rotation axis, the reel tines can continue to engage crop with the required conveying force, move it in rotational direction of the reel across the cutter bar, and subsequently place it onto the receiving surface of the header and/or of the conveying device.

Of course, it is also possible to enable the rotational movement of the reel tine also opposite to the action of a force store, for example, a spring. The force store can however be designed in this context such that it builds up only comparatively minimal restoring forces so that a certain moderate conveying pressure of the crop is required in order to push the free end of the reel tine to the side. Driven by the restoring forces from the force store, the reel tine then moves back faster into its normal position again as would be the case for a purely gravitationally effected restoring movement. Despite the springy support of the conveying tine with only a moderate spring force in the conveying direction of the crop, the steadily provided conveying action in rotational direction of the reel remains.

When the free end of a reel tine is folded, the clearance between the cutter bar and the bottom edge of the respective reel tine is enlarged while a height adjustment of the reel stays the same. In this context, the free end of a reel tine moves in a direction which corresponds to the conveying direction of the crop. A built-up stack of the crop moves then without disturbance in conveying direction and is not braked by rigid reel tines that are engaging the crop. Possible grain losses which might result in the region of rigid reel tines are avoided in this manner.

According to an embodiment of the invention, the evasion position in relation to the neutral position corresponds to a spatial position of the reel tine in which the free end of the reel tine is also moved forward or rearward in relation to the rotational direction of the reel. In this embodiment, the reel tine does not pivot in a direction that is parallel to the rotation axis of the reel but at an angular displacement thereto. In case of a forward displacement, the free end of the reel tine follows the movement direction of the crop, as far as the latter not only moves in conveying direction but into the rearward regions of the receiving surface that are farther removed from the cutter bar. The stack of crop is torn apart less in this way. In case of a rearward displacement, the stack in its upper region receives a conveying component that is opposite to the intake direction of the crop. Due to the conveyance of the crop stack in its lower region in the direction toward the harvesting machine, the stack experiences an angular momentum by means of which the intake and the discharge of the crop in the direction of the harvesting machine are improved. The support of the reel tine can be configured such that its angle position in relation to the neutral position is adjustable, namely with respect to an adjustment of the setting angle as such as well as with respect to an adjustment between an advance and a lag. In this way, the reel tines can be adapted optimally to a respective crop and to the working conditions present during harvest of this crop.

According to an embodiment of the invention, the movability of the reel tine from the neutral position in a direction that is opposite to the conveying direction of the conveying device in the region of the respective reel tine, or corresponds thereto, is blocked by a stop. The stop which is arranged in the direction which corresponds to the conveying direction of the conveying device makes it possible to limit the evasion movement of the reel tine. The same holds true for a stop which blocks in the direction of the respective reel tine opposite to the conveying direction of the conveying device. When the stop is designed to be adjustable, the reel tines can be adjusted across the working width of the header to a maximum deflection in which the flow of crop in the conveying direction is disturbed as little as possible by the reel tines.

According to an embodiment of the invention, the control is designed as a pivot axis which forms the rotation axis and which is not oriented parallel to the length extension direction of the reel rake tube. The pivot axis can be the bearing shaft with which the reel tine is held at the reel rake tube. For a rotational but fixedly positioned bearing of the reel tine at the reel rake tube by means of a bearing shaft, the free end of the reel tine moves only along a defined movement path from a neutral position into an evasion position and back again.

According to an embodiment of the invention, as a control, a stationary glide surface which is positioned at a slant to the rotation axis of the reel tine is embodied as a control gate, on which the reel tine is held by a support surface that glides on the glide surface upon rotational movement of the reel tine about the rotation axis. The glide surfaces can be held by a tension spring on each other so that a restoring force is built up upon a relative rotational movement of the glide surfaces on each other. A glide surface support can be of a closed configuration so that crop cannot easily get caught thereon and accumulate thereat. As a control gate, a guide slot can also be used that enables only a translatory movement along the structural control edges of the gate guide.

According to an embodiment of the invention, the reel tine is movable against the force of gravity from the neutral position into the evasion position. Due to the relatively minimal forces that are sufficient for upward folding of the reel tines, minimal forces may already suffice also for restoring the reel tines into the initial position. Thus, for example, already the own weight of the reel tine may be sufficient to enable its movement back into its initial position when the force impulse of the contact of the free end of the reel tine with the crop is canceled. For conveyance and for securing the restoring movement, the free end of the reel tine can be provided with a special weight, such as a lead weight or another metallic spatial body.

According to an embodiment of the invention, the reel tine in the neutral position and/or in one or a plurality of evasion positions can be locked by a holder. When the conveying action of the reel tines is not needed, or when it is desirable to come closer with the reel rake tubes to the ground of the field and/or the cutter bar, this adjustment possibility is advantageous. The holder can be, for example, locking noses that match corresponding cutouts in the surface of the contact surface of the reel tine, or vice versa. A locking nose that has locked in the corresponding cutout holds the reel tine in the desired position. After overcoming the locking resistance of a locking nose, the reel tine is adjustable into another pivot position in which it is held again by a locking nose in a locked position. In place of a locking connection, also many other adjustable connection techniques can be used.

According to an embodiment of the invention, the maximum achievable evasion position is limited by a stop and the free end of the reel tine is deflected in its maximum evasion position out of the neutral position by up to 75° in a direction transverse to the working direction of the header. The stops prevent that the reel tines can pivot into angle positions in which they are no longer sufficiently effective for conveying. Due to the limitation of the maximum evasion position to an angle of up to 75° from the neutral position, the free end of the reel tine is still active, at least to a small degree, with respect to conveyance.

According to an embodiment of the invention, the reel tine is movable from the neutral position into an evasion position under the action of a force$\geq 5$ N acting on it in a direction corresponding to the conveying direction of the conveying device in the region of the respective reel tine. With the aforementioned minimum actuating force, it is prevented that the reel tines can swing freely or can be accidentally repositioned in suspended position.

Further features of the invention result from the claims, the Figures, and the description of the subject matter. All features and feature combinations mentioned above in the description as well as the features and feature combinations mentioned in the following in the figure description and/or shown only in the Figures are not only usable in the respectively indicated combination but also in other combinations, but also individually.

BRIEF DESCRIPTION OF THE DRAWINGS

The invention will now be explained in more detail with the aid of a preferred embodiment as well as with reference to the attached drawings.

DESCRIPTION OF PREFERRED EMBODIMENTS

Figure 1:
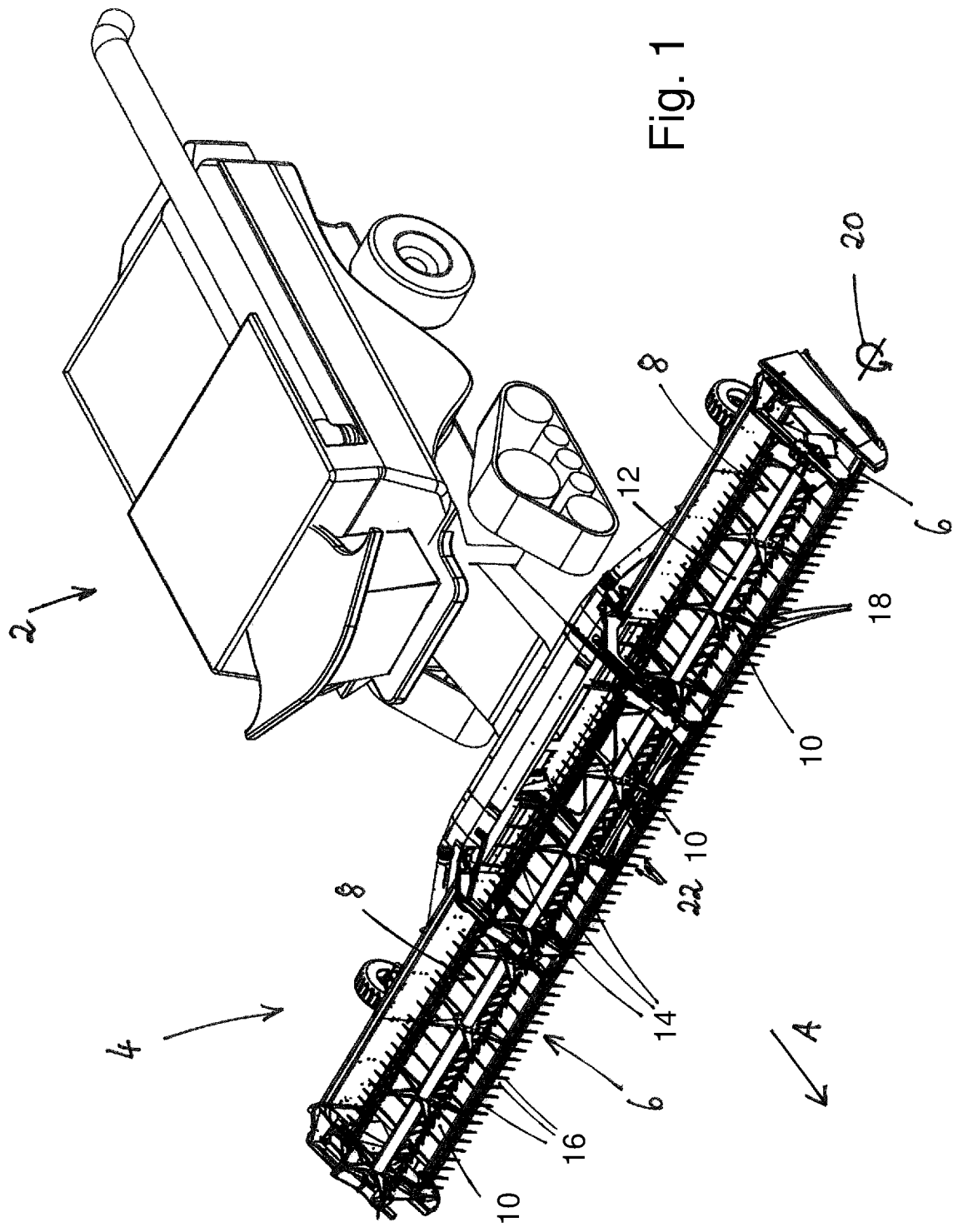
FIG. 1 shows a harvesting machine with a header attached to the front side.

In FIG. 1, a harvesting machine 2 with a header 4 attached to the front side is illustrated. The header 4 comprises a cutter bar 6 with which the harvesting machine 2 moves into the standing crop in working direction A and cuts the crop. The cut crop falls onto the receiving surface 8 from where it is conveyed in conveying direction F with a conveying device 10 in the direction of the receiving members of the harvesting machine 2. In the illustrated embodiment, the receiving surface 8 is the top face of an endlessly circulating belt conveyor which forms the conveying device 10 in the embodiment. The header 4 in the embodiment is a draper header; the invention can also be used in all other known header types that comprise a reel. In particular, the present invention is usable also in headers 4 with rigid screw conveyors arranged therein as a conveying device 10. For a header 4 of the draper type, it should be noted that the problem with conveying tines 16 that are disruptive for the transverse conveying action applies only to the outwardly positioned conveyor belts because they convey the crop transversely to the working direction of the combine. The central belt conveys the crop placed thereon directly to the rear in the direction of the slanted conveying channel of the combine so that here the problem of reel tines that convey in a direction transverse to the conveying direction of the crop does not exist.

So that the crop does not fall underneath the header 4 after it has been cut by the cutter bar 6 and prior to it having fallen onto the receiving surface 8, the reel 12 supports the crop in this phase. The reel 12 is held at height-adjustable support arms. The reel 12 is held at the support arms so as to be longitudinally adjustable. The reel 12 is driven in rotation in the rotational direction 20 wherein the rotary speed is adjustable. In case of some headers 4, also the setting angle of the reel tines 16 fastened to the reel rake tube 14 is selectively adjustable as needed. Each reel tine 16 is connected by a bearing 18 to the reel rake tube 14. At its end which is remote from the bearing 18, the free end 22 of the respective reel tine 16 is located.

Figure 2:
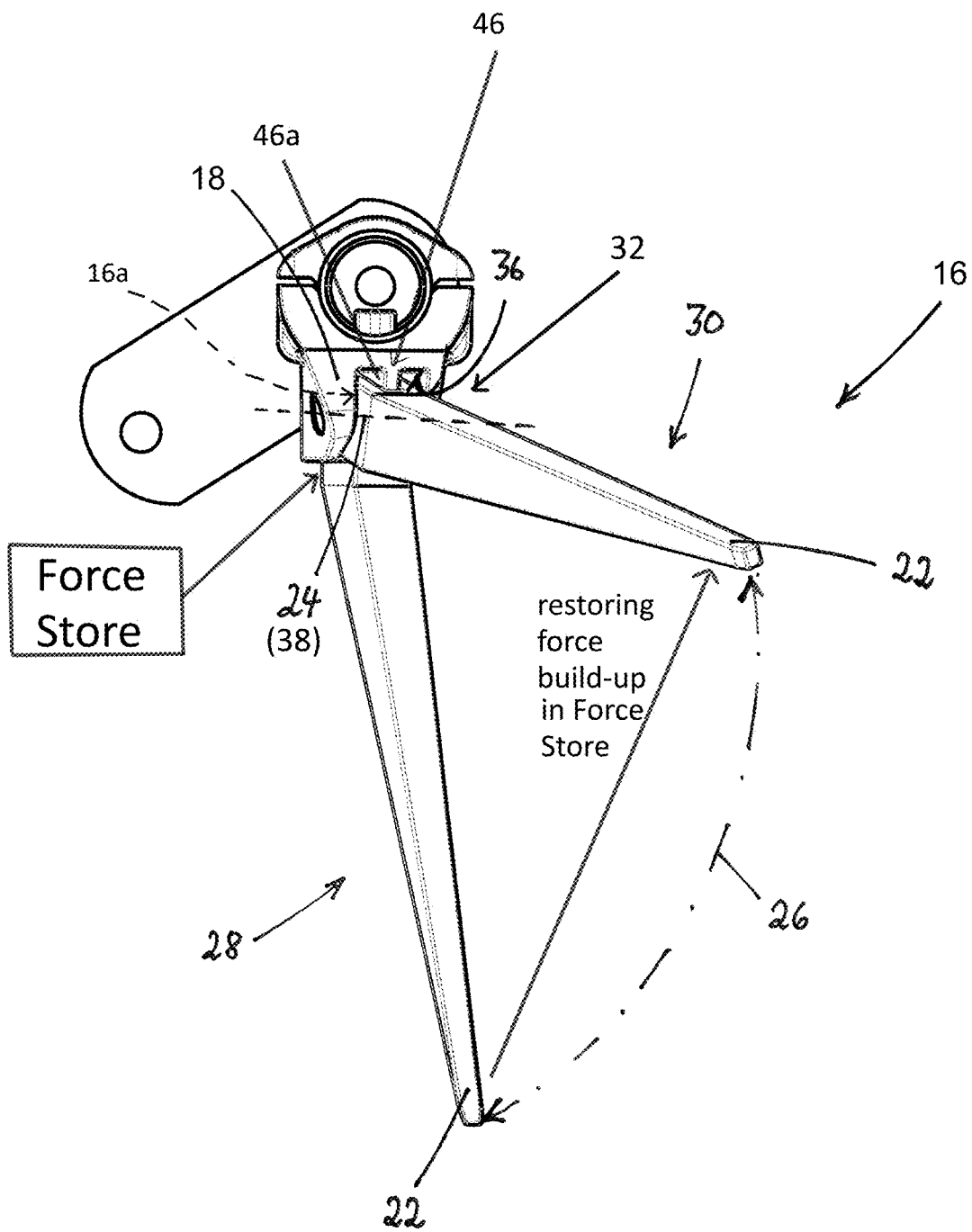
FIG. 2 shows a view of a reel tine with two extreme pivot positions.

FIG. 2 shows a view of a reel tine 16 with two extreme pivot positions: a first neutral position 28 and a second evasion position 30. Between these two extreme positions, the reel tine 16 is movable about a rotation axis 24 along a movement path 26 which is predetermined by a control 32. As control 32, in the illustrated embodiment a pivot axis 38 is used which is held in a corresponding cutout in the bearing 18. Stops 36 prevent that the reel tine 16 can pivot into pivot positions in which it is no longer active with respect to conveyance.

As a control, a stationary glide surface 46a positioned at a slant to the rotation axis 24 of the reel tine 16 is embodied as a control gate 46. The reel tine 16 is held by a support surface 16a that glides on the glide surface 46a upon rotational movement of the reel tine 16 about the rotation axis 24. The glide surfaces 16a, 46a can be held by a tension spring (force store) on each other so that a restoring force is built up upon a relative rotational movement of the glide surfaces 16a, 46a on each other.

Figure 3:
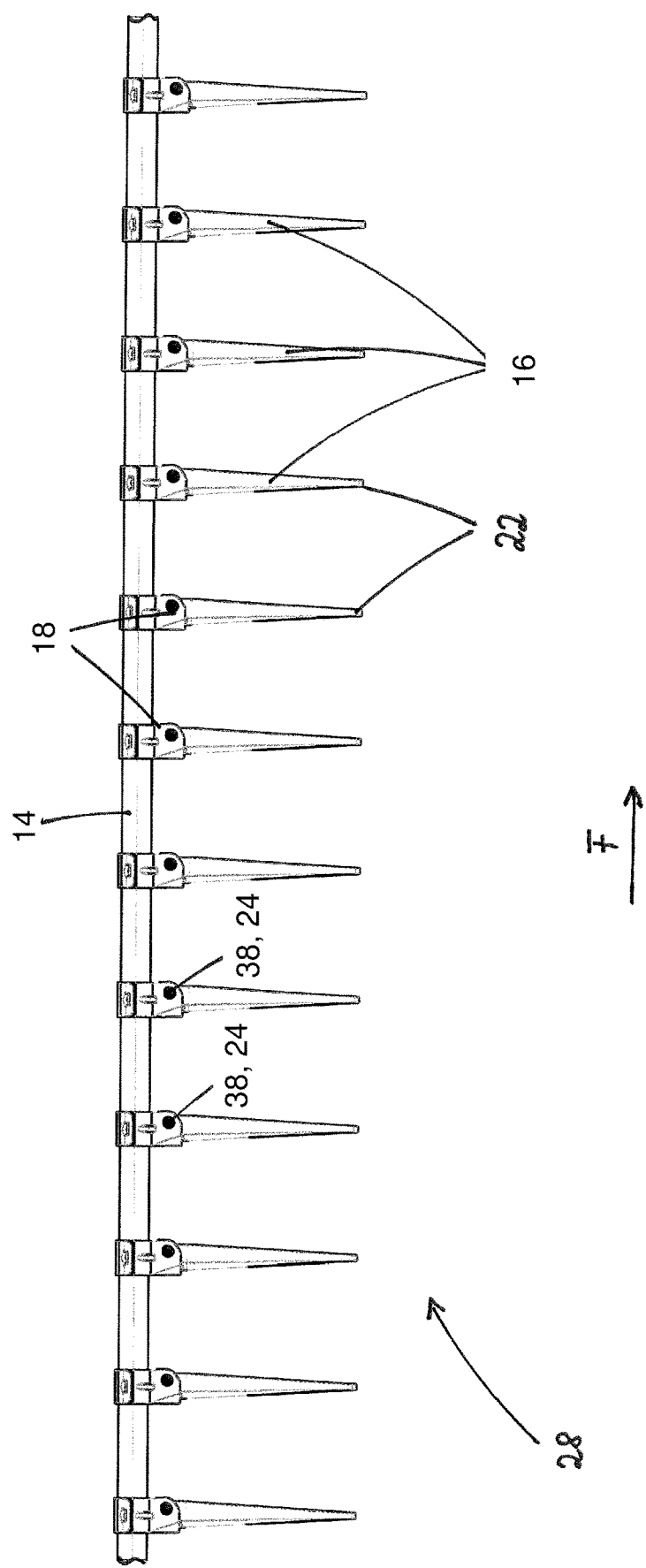
FIG. 3 shows a view of a reel rake tube with reel tines that are vertically suspended.

FIG. 3 shows a view of a reel rake tube 14 with vertically suspended reel tines 16. In this pivot position, the free ends 22 of the reel tines 16 extend as much as possible downwardly. In rotational direction 20 of the reel 12, the reel tines 16 are rigid while in conveying direction F they are pivotable about the rotation axis 24 when crop moved in conveying direction F brushes against the free ends 22 of the reel tines 16.

Figure 4:
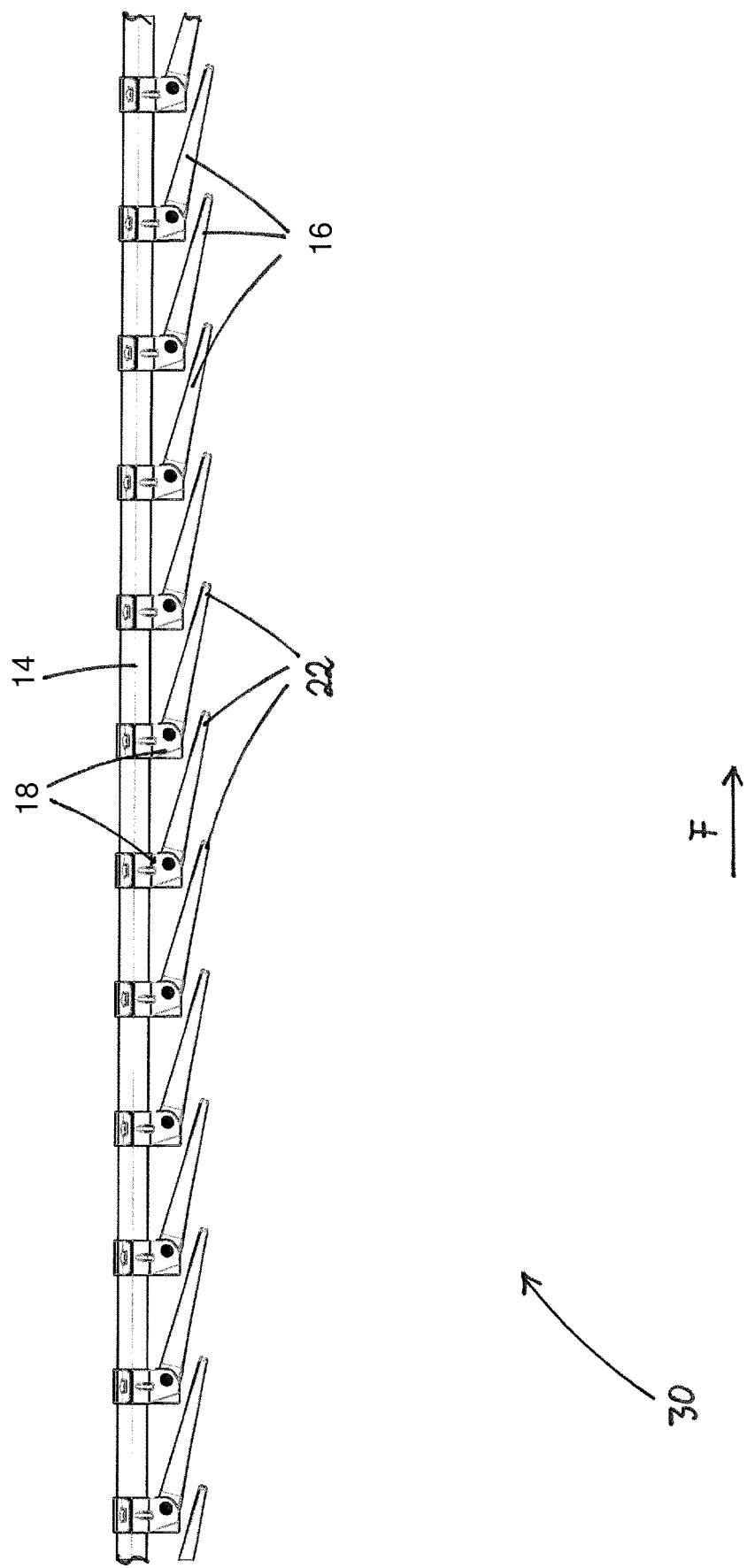
FIG. 4 shows a view of the reel rake tube illustrated in FIG. 3 in which the free ends of the reel tines are pivoted to the side.

In FIG. 4 a view of the reel rake tube 14 illustrated in FIG. 3 is shown in which the free ends of the reel tines 16 are pivoted correspondingly in conveying direction F. When comparing FIGS. 3 and 4, it is apparent that the reel tines 16 leave much more free space below the reel rake tube 14 so that a stack of crop can be conveyed through this free space without being hindered in doing so by the free ends 22 of the reel tines 16. The length of the reel tines 16 by which they are suspended downwardly vertically in the neutral position is available upon pivoting to the side almost completely as additional height of the intermediate space between the reel rake tube 14 and the ground of the field or the cutter bar 6.

Figure 5:
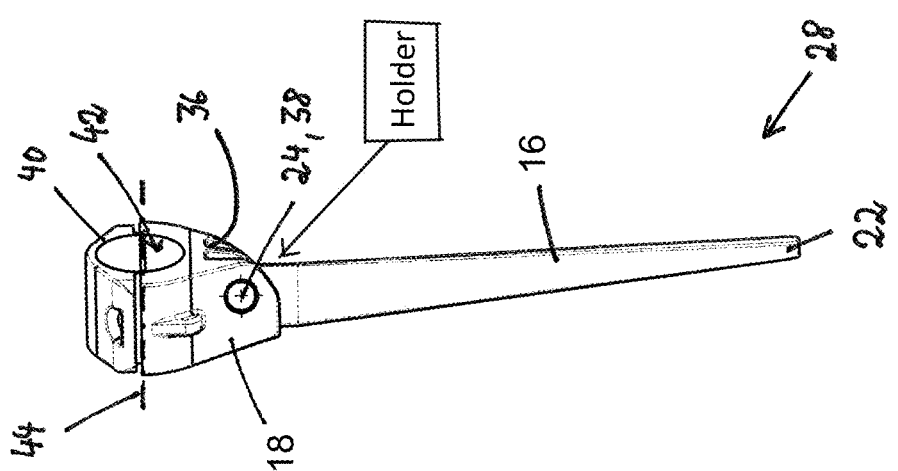
FIG. 5 shows a view of an individual reel tine, not pivoted.

In FIG. 5, a view of an individual reel tine 16 locked by a holder in a non-pivoted position is shown. The reel tine 16 is configured to be locked by a holder in the neutral position (non-pivoted position) and/or in the one or more evasion positions. In this view of FIG. 5, the fastening eye 40 can be seen well via which the bearing 18 can be connected to the reel rake tube 14. The fastening eye 40 comprises a cavity 42 with a longitudinal center axis 44 that serves for receiving a reel rake tube 14 when the reel tine 16 is to be attached thereto.

Figure 6:
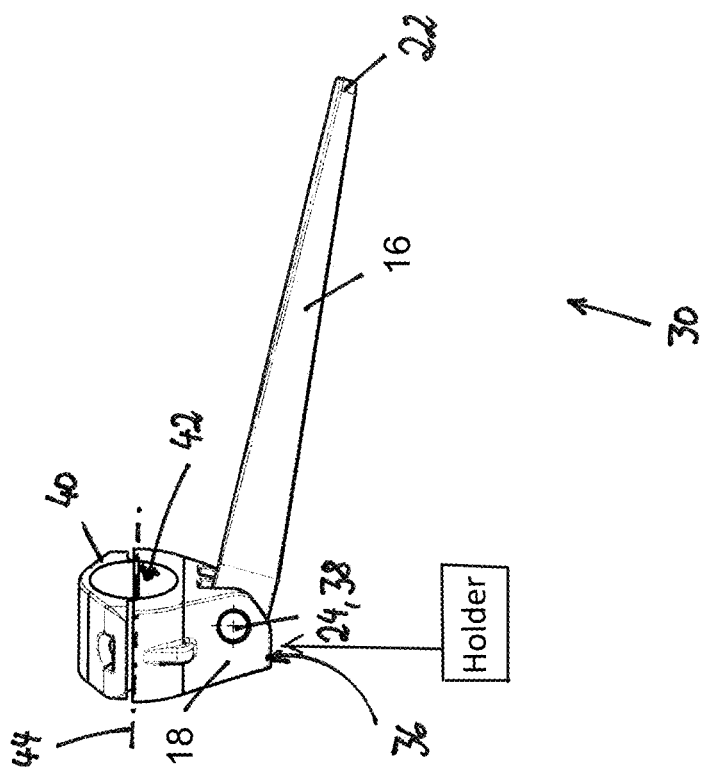
FIG. 6 shows a view of the reel tine illustrated in FIG. 5 in a pivot position.

In FIG. 6, a view of the reel tine 16 illustrated in FIG. 5 is illustrated in a pivot position. In this pivot (evasion) position, the reel tine 16 is held by a holder such that it almost contacts in parallel the reel rake tube 14.

The invention is not limited to the aforementioned embodiments. A person of skill in the art will have no difficulties to modify the embodiments in a manner appearing suitable to him in order to adapt them to a concrete application situation.

LIST OF REFERENCE CHARACTERS 2 harvesting machine
4 header
6 cutter bar
8 receiving surface
10 conveying device
12 reel
14 reel rake tube
16 reel tine
18 bearing
20 rotation direction of the reel 22 free end
24 rotation axis
26 movement path
28 neutral position
30 evasion position
32 control
36 stop
38 pivot axis
40 fastening eye
42 cavity
44 longitudinal center axis
A working direction
F conveying direction

What is claimed is:

1. A header configured to attachment to a harvesting machine, the header comprising:
    a frame;
    a cutter bar arranged at a front side of the header;
    a receiving surface configured to receive a cut crop;
    conveying devices configured to convey the cut crop in a conveying direction;
    a reel rotatably driven and movably connected to the frame, wherein the reel extends in a direction transverse to a working direction of the header;
    wherein the reel comprises a plurality of reel rake tubes distributed about a circumference of the reel in a rotational direction of the reel;
    wherein the reel comprises reel tines fastened to the reel rake tubes;
    wherein at least some of the reel tines are rotatably supported in a respective bearing at the respective reel rake tube and configured to carry out a rotational movement about a rotation axis along a movement path from a neutral position into one or more evasion positions, when impacted by the cut crop conveyed in the conveying direction of one of the conveying devices arranged in a region of the respective reel tine, and back again into the neutral position, when the cut crop has passed, wherein the movement path is predetermined by a control;
    wherein the one or more evasion positions in relation to the neutral position correspond to a spatial position of the respective reel tine, wherein in the spatial position a free end of the respective reel tine has moved in a direction corresponding to the conveying direction of one of the conveying devices arranged in a region of the respective reel tine, and wherein a distance of the free end of the respective reel tine relative to the respective reel rake tube in the spatial position is reduced in relation to a distance of the free end of the respective reel tine relative to the respective reel rake tube in the neutral position;
    wherein the control comprises:
        a pivot axis forming the rotation axis, wherein the pivot axis is not oriented parallel to a longitudinal extension direction of the respective reel rake tube, or
        a stationary glide surface that is positioned at a slant to the rotation axis and configured as a control gate, wherein the respective reel tine comprises a support surface, wherein the support surface is held on the glide surface and configured to glide on the glide surface when the respective reel tine rotates about the rotation axis.

2. The header according to claim 1, wherein in the spatial position the free end of the respective reel tine is also moved forwardly or rearwardly in relation to the rotational direction of the reel.

3. The header according to claim 1, wherein a movability of the respective reel tine from the neutral position in a direction opposite to or corresponding to the conveying direction of said of one of the conveying devices arranged in the region of the respective reel tine is locked by a stop.

4. The header according to claim 1, wherein the respective reel tine is movable against a force of gravity out of the neutral position into the one or more evasion positions.

5. The header according to claim 1, wherein the respective reel tine is connected to a force store configured to build up a restoring force when the respective reel tine moves from the neutral position into the one or more evasion positions.

6. The header according to claim 1, wherein the respective reel tine is configured to be locked by a holder in the neutral position and/or in one or more of the evasion positions.

7. The header according to claim 1, wherein the one or more evasion positions include a maximally reachable evasion position that is delimited by a stop, wherein the free end of the respective reel tine in the maximally reachable evasion position is deflected by up to 75° from the neutral position in a direction transverse to the working direction of the header.

8. The header according to claim 1, wherein the respective reel tine is configured to move out of the neutral position into the one or more evasion positions by a force ≥5 N acting on the respective reel tine in a direction corresponding to the conveying direction of said one of the conveying devices arranged in the region of the respective reel tine.

9. A reel tine comprising:
    a free end and an opposite end opposite the free end;
    a bearing, wherein the opposite end is rotatably supported about a rotation axis in the bearing;
    wherein the bearing comprises a fastening eye with a cavity configured to receive a reel rake tube, wherein the cavity comprises a longitudinal center axis having an orientation corresponding to a longitudinal extension direction of the reel rake tube to be received in the cavity;
    wherein a rotational movement of the reel tine in the bearing is realized about the rotation axis in a rotational direction along a movement path from a neutral position into one or more evasion positions and back again into the neutral position, wherein the movement path is predetermined by a control;
    wherein the reel tine, when mounted on the reel rake tube of a header, is configured to move in the rotational direction into the one or more evasion positions when impacted by cut crop conveyed on the header in a conveying direction and to be stiff in an axial direction of the rotation axis, wherein a distance of the free end of the reel tine relative to the reel rake tube in the one or more evasion positions is reduced in relation to a distance of the free end of the reel tine relative to the reel rake tube in the neutral position;
    wherein the control comprises:
        a pivot axis forming the rotation axis, wherein the pivot axis is not oriented parallel to the longitudinal extension direction of the reel rake tube to be received in the cavity, or
        a stationary glide surface that is positioned at a slant to the rotation axis and configured as a control gate, wherein the reel tine comprises a support surface, wherein the support surface is held on the glide surface and configured to glide on the glide surface when the reel tine rotates about the rotation axis.

10. The reel tine according to claim 9, wherein a movability of the reel tine away from the neutral position is locked by a stop.

11. The reel tine according to claim 9, wherein the reel tine is connected to a force store configured to build up a restoring force when the reel tine moves from the neutral position into the one or more evasion positions.

12. The reel tine according to claim 9, wherein the reel tine is configured to be locked by a holder in the neutral position and/or in the one or more evasion positions.

13. The reel tine according to claim 9, wherein the one or more evasion positions include a maximally reachable evasion position that is delimited by a stop, wherein the free end of the reel tine in the maximally reachable evasion position is deflected by up to 75° from the neutral position in the rotational direction.

14. The reel tine according to claim 9, wherein the reel tine is configured to move out of the neutral position into the one or more evasion positions by a force $\geq 5$ N acting on the reel tine in the rotational direction.

* * * * *